No. 713,484. Patented Nov. 11, 1902.
C. D. NELSON.
FRUIT ASSORTING TABLE.
(Application filed Feb. 15, 1902.)
(No Model.) 2 Sheets—Sheet 1.
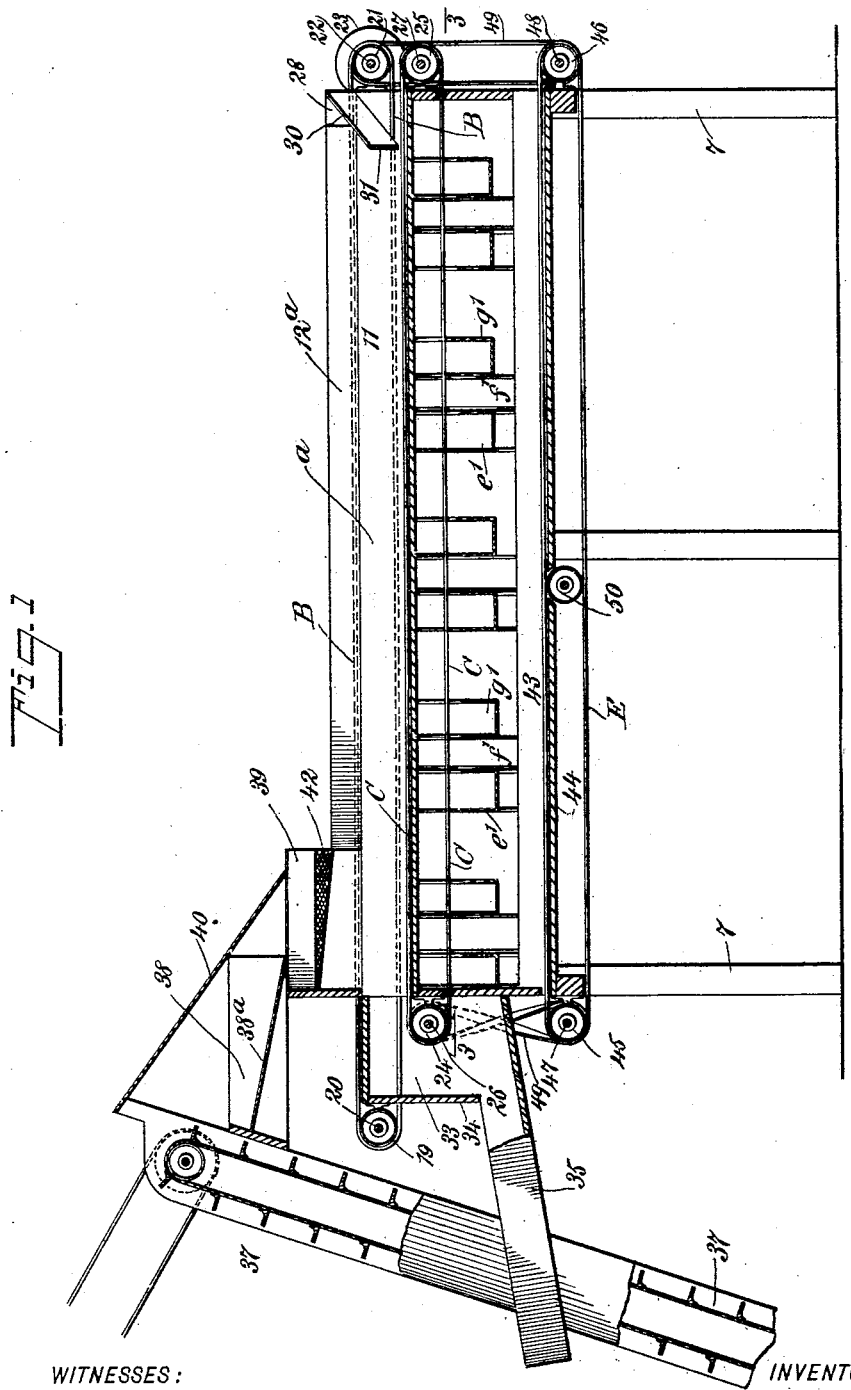
WITNESSES:
INVENTOR
Clinton D. Nelson
BY
ATTORNEYS No. 713,484. Patented Nov. 11, 1902.
C. D. NELSON.
FRUIT ASSORTING TABLE.
(Application filed Feb. 15, 1902.)
(No Model.) 2 Sheets—Sheet 2.
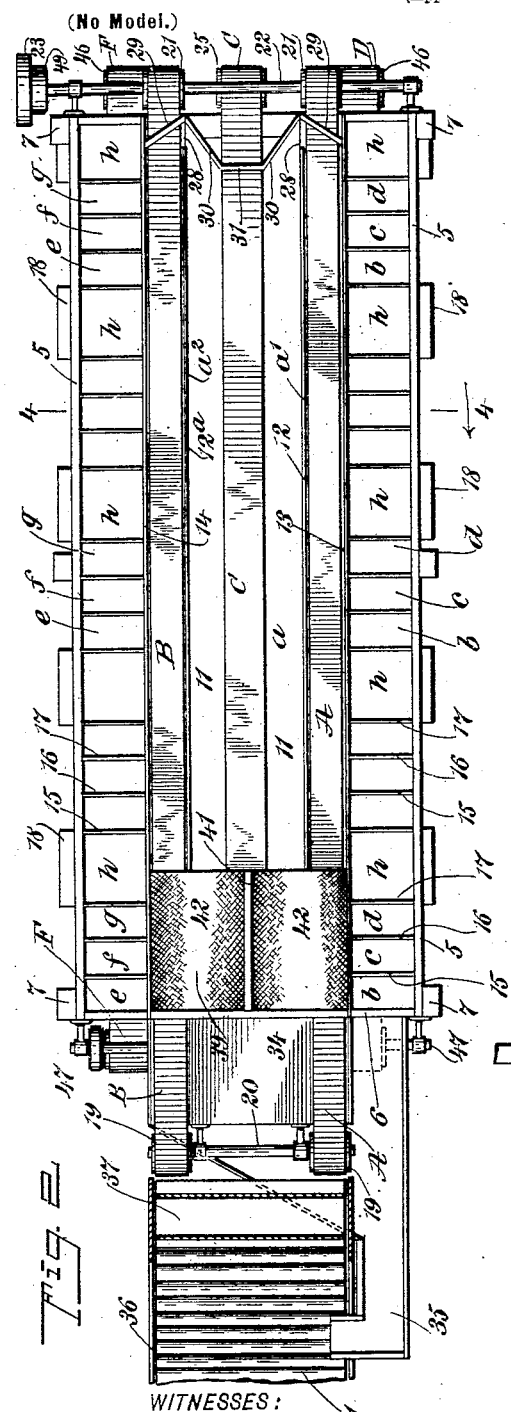
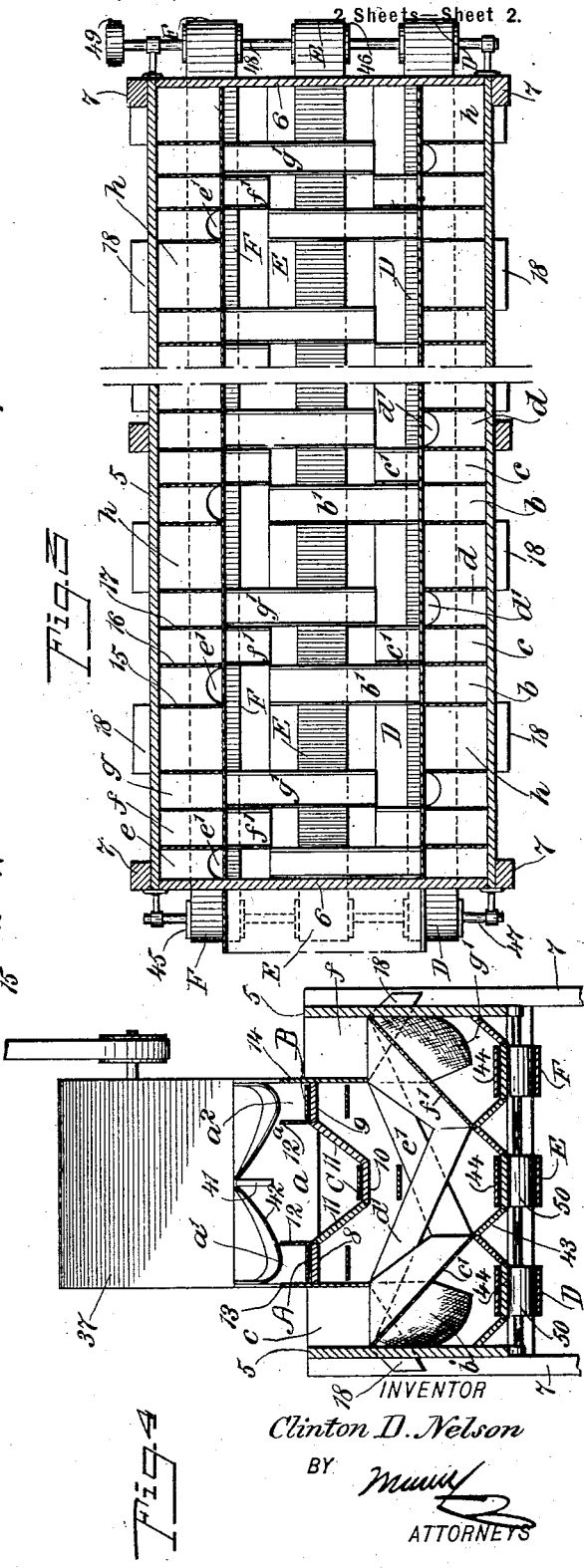
WITNESSES:
INVENTOR
Clinton D. Nelson
BY
ATTORNEYS
THE NORRIS PETERS CO., PHOTO-LITHO., WASHINGTON, D. C.

UNITED STATES PATENT OFFICE.

CLINTON D. NELSON, OF SAN DIMAS, CALIFORNIA.

FRUIT-ASSORTING TABLE.

SPECIFICATION forming part of Letters Patent No. 713,484, dated November 11, 1902.

Application filed February 15, 1902. Serial No. 94,205. (No model.)

*To all whom it may concern:*

Be it known that I, CLINTON D. NELSON, a citizen of the United States, and a resident of San Dimas, in the county of Los Angeles and State of California, have invented new and useful Improvements in Fruit-Assorting Tables, of which the following is a full, clear, and exact description.

My invention relates to improvements in fruit-assorting tables, more especially designed as a means for grading oranges and lemons according to different qualities, although it is evident that other kinds of fruit may be subjected to treatment in the machine.

It is now the common practice to assort oranges and lemons into at least three distinct grades for commercial use, known, respectively, as "fancy," "choice," and "standard."

The object of the present invention is the provision of a compact simple machine adapted to allow the desired grading of the fruit and to enable operators to be stationed on both sides of the apparatus.

A further object is to automatically return to the place of supply all the fruit which may not be picked out by the assorting attendants and which may pass through the machine from end to end thereof in case the supply of fruit is so rapid or great that the attendants cannot assort it all.

With these ends in view the invention consists in the novel combination, construction, and arrangement of parts, which will be hereinafter fully described and claimed.

Reference is to be had to the accompanying drawings, forming a part of this specification, in which similar characters of reference indicate corresponding parts in all the figures.

Figure 1 is a vertical longitudinal section taken centrally through a fruit-assorting table constructed in accordance with my invention. Fig. 2 is a plan view thereof. Fig. 3 is a horizontal sectional view, the plane of the section being indicated by the dotted line 3 3 in Fig. 1; and Fig. 4 is a vertical transverse section in the plane of the dotted line 4 4 in Fig. 2.

In carrying my invention into practice I employ a suitable supporting-frame consisting of the side pieces 5 and the cross-pieces 6, and this frame is sustained in an elevated position, convenient to the picking attendants, by the legs 7.

Arranged longitudinally in the upper part of the supporting-frame is a false bottom consisting of the side pieces 8 9, the central piece 10, and the inclined intermediate pieces 11, (see Fig. 4,) said intermediate pieces extending on converging lines from the side pieces 8 9 to the central piece 10. Within this false bottom are arranged the vertical strips 12 $12^a$, arranged to extend upward from the side pieces 8 9, and these upstanding pieces 12 $12^a$, in conjunction with the inclined pieces 11 and the central piece 10, form a longitudinal chute, which is indicated in its entirety by the reference-letter $a$.

On opposite sides of the longitudinal chute are arranged the partitions 13 14, which lie parallel to the sides 5 of the frame and the upstanding walls 12 $12^a$ of the chute, and the spaces between these partitions 13 14 and the side walls 5 are divided by the transverse partitions 15 16 17, thereby forming groups of pockets at the sides of the supporting-frame. One series of pockets on one side of the supporting-frame are indicated by $b$, $c$, and $d$, while another series of pockets on the opposite side of the frame are indicated by $e$, $f$, and $g$. These two series of pockets $b$ to $g$, inclusive, constitute a group, and a number of these groups are provided throughout the length of the machine. Between the partitions 15 and 17 of each series of three pockets there is provided a larger pocket $h$, from which leads a discharge-chute 18, the same extending through one side of the machine-frame and arranged to discharge the culled and imperfect fruit into suitable receptacles.

The spaces inclosed between or bounded by the walls 12 $12^a$ 13 14 and the bottom pieces 8 9 form a pair of feed-channels, (indicated by the reference-letters $a'$ $a^2$,) said feed-channels being located on opposite sides of the central channel, which, in effect, forms the return-chute $a$. These feed-channels are located within the series of assorting-pockets at the sides of the machine, and the fruit to be picked and assorted is conveyed through the feed-channels $a'$ $a^2$ by any suitable means— as, for example, by the conveyers A B. Each conveyer is in the form of an endless apron or belt arranged longitudinally within the frame, so that the upper lead of the apron will extend through the feed-channel; but other desired forms of conveyers may be employed. The conveyers extend the full length of the machine, and at the head or inlet end of the frame said conveyers are fitted to the pulleys 19, which are mounted on the shaft 20. The opposite ends of the conveyers A B are fitted to the pulleys 21 on the shaft 22, and this shaft 22 is provided with the driving-pulley 23, adapted to be propelled by a belt from any suitable source of power.

C indicates the return-conveyer, also in the form of an endless apron or belt and arranged longitudinally of the machine. This return-conveyer has its upper lead arranged to travel close to the bottom strip 10, and the opposite end portions of this return-conveyer are fitted to pulleys 24 25 on the shafts 26 27, respectively, said shafts being journaled at opposie ends of the machine-frame and the shaft 27 being belted or geared to the shaft 22, so that the conveyer C will be driven or propelled in an opposite direction to the conveyers A B. The purpose of this conveyer C is to transport the surplus fruit which may be fed or supplied to the machine back to the place of inlet in case the operators stationed at both sides of the machine cannot work fast enough to pick and assort the fruit transported by the feed-conveyers A B. The partitions 13 14 are provided at the foot or rear end of the machine with the escape-openings 28, thus making provision for communication between the feed-channels $a'$ $a^2$ and the return-chute $a$. Across the feed-channels at the foot end of the machine are disposed the inclined deflectors 29, which extend across the feed-conveyers A B and terminate at the escape-openings 28. Reversely-inclined deflectors 30 meet or intersect with the first-named deflectors 29, and said deflectors 30 are joined by the bridge 31, so that the surplus fruit on the conveyers A B which strikes the deflectors 29 30 will be discharged into the chute $a$, whereby the surplus fruit will lodge upon the return-conveyer C and be carried through the chute $a$ in an opposite direction. The return-conveyer C delivers the fruit thereon into a chamber 33, which is formed by a boxing or casing 34, having an inclined trough 35, the latter being arranged to discharge its contents back into the feed-receptacle 36, from which the fruit is taken by suitable elevator mechanism, (indicated at 37.) The fruit is discharged from the elevator into an elevated box 38, which in turn discharges it into a second box 39, the latter being disposed below the box 38. Over the two boxes is an inclined hood 40, which prevents the fruit from escaping from the boxes. The box 38 has an inclined bottom $38^a$, of a suitable fibrous material, arranged to deliver the fruit to the box 39. Said last-mentioned box is divided by a vertical partition 41 into separate compartments, and the bottom 42 of said box 39 is fibrous and loosely suspended over the partition 41, whereby the fibrous inclined bottom 42 may form short chutes arranged to discharge the fruit into the feed-channels $a'$ $a^2$, as more clearly represented by Fig. 4.

A series of inclined division-walls 43 is arranged in a horizontal plane below the return-chute $a$, the groups of assorting-pockets, and the feed-channels. (See Fig. 4.) These division-walls are inclined toward the horizontal strips 44, a series of three of which are provided in spaced longitudinal relation, so as to extend longitudinally of the frame at the bottom part thereof, one of said strips 44 lying below the series of assorting-pockets on one side of the machine, another strip 44 below the pockets on the opposite side of the machine, and the middle strip 44 substantially below the return-chute $a$ at the center of the machine. A series of discharge-conveyers D E F are arranged longitudinally of the machine, so as to have the upper leads of said conveyers travel over the strips 44, the conveyers traveling in the same directions of the feed-conveyers A B. These discharge-conveyers are supported by the pulleys 45 46 on the shafts 47 48, provided at opposite ends of the machine, and the shaft 47 is driven by a crossed belt 49 or other gearing from the shaft 26, whereby the entire series of discharge-conveyers is driven from a common source of power. Idle rollers or pulleys 50 are arranged at points intermediate of the length of the discharge-conveyers to prevent the latter from sagging. (See Fig. 1.)

From the foregoing description, taken in connection with the drawings, it will be seen that I have provided six grading-pockets in each group and that three delivery-conveyers are provided in the machine. It is intended that three of the pockets shall be arranged on one side of the machine, a like number on the opposite side of the machine, and that two attendants shall be stationed on opposite sides of the machine and adjacent to each series of three pockets. The attendants pick out the fruit according to the quality thereof by removing said fruit from the conveyers A B, and fruit of one quality is placed in the pockets $b$ or $e$, another quality of fruit is deposited in the pockets $c$ and $f$, and the third quality of fruit in the pockets $d$ and $g$. One of the peculiarities of my invention resides in an arrangement of spouts whereby corresponding pockets on opposite sides of the machine and in the same group may discharge to the same conveyer. The pocket $b$ of each group is provided with a short spout $b'$, arranged to discharge to the conveyer D, and to this same conveyer is arranged to discharge the long spout $e'$ of the corresponding oppositely-placed pocket $e$. The pockets $c$ $f$ are provided with the spouts $c'$ $f'$, which extend inwardly below the false bottom forming the chute $a$, so that the spouts $c'$ $f'$ will both discharge to the delivery-conveyer E. The pocket $g$ has a short depending spout $g'$, that discharges to the conveyer F, while the corresponding pocket d on the opposite side of the machine has a long spout d', arranged to extend across the machine and discharge to the same conveyer F, all as more clearly shown by Fig. 4.

It will be seen that the parts of the machine are very compactly arranged, so as to allow two rows of operators to be stationed on opposite sides of the machine, and the pair of facing operators pick off the fruit supplied to the machine by the conveyers A B. Fruit of one quality placed in the pockets b and e is delivered from the rear end of the machine by the conveyer D, while fruit of another quality placed in the pockets c and f is discharged by the conveyer E, and finally fruit of still another quality deposited in the pockets d and g is discharged by the conveyer F.

Having thus described my invention, I claim as new and desire to secure by Letters Patent—

1. A fruit-assorting table provided with a feed-channel, assorting-pockets adjacent to said feed-channel, and a return-channel arranged to carry the fruit in an opposite direction to the feed-channel, said return-channel communicating with the feed-channel at a point beyond the assorting-pockets.

2. A fruit-assorting table provided with parallel feed-channels, assorting-pockets adjacent to said feed-channels, and means for returning the surplus fruit to the source of supply.

3. A fruit-assorting table provided with a longitudinally-arranged feed-conveyer, assorting-pockets adjacent to said feed-conveyer, and a return-conveyer movable in an opposite direction to the feed-conveyer and arranged to receive a load therefrom at a point beyond the assorting-pockets.

4. A fruit-assorting table provided with parallel feed-channels each having a feed-conveyer, assorting-pockets adjacent to said feed-channels, a return-channel located between and having connection with said feed-channels, and a return-conveyer movable through the return-channel and in an opposite direction to the feed-conveyers.

5. A fruit-assorting table provided with a feed-channel, assorting-pockets adjacent thereto, a return-channel, and means for deflecting fruit from the feed-channel into the return-channel at a point beyond the assorting-pockets.

6. A fruit-assorting table provided with feed-conveyers, a return-conveyer located between said feed-conveyers, assorting-pockets arranged in series adjacent to the feed-conveyers, and reversely-arranged deflectors disposed across the feed-conveyers and in the path of the loads thereon to change the course of the latter toward the return-conveyer.

7. A fruit-assorting table provided with feed-channels, and an intermediate return-channel, conveyers movable in said feed-channels, deflectors in operative relation to the conveyers and adapted to direct the surplus fruit into the return-channel, and means for carrying the fruit through said return-channel.

8. A fruit-assorting table provided with feed-channels at the sides of the table, a return-channel between the feed-channels, groups of assorting-pockets disposed adjacent to the feed-channels and each having spouts extending below the return-channel, and a series of delivery-conveyers below the feed and return channels, and each arranged to receive the contents of two of said pockets of each group.

9. A fruit-assorting table provided with feed-conveyers at the sides of said table, a return-conveyer between and movable in an opposite direction to the feed-conveyers, a series of delivery-conveyers below the feed and return conveyers, and groups of assorting-pockets adjacent to the feed-conveyers, two pockets of each group on opposite sides of the table being arranged to deliver their contents to one delivery-conveyer.

10. A fruit-assorting table provided with feed-conveyers at the sides of said table, a return-conveyer between said feed-conveyers, groups of assorting-pockets having members disposed on opposite sides of the feed-conveyers, and delivery-conveyers disposed below the feed and return conveyers, each delivery-conveyer having communication with two pockets of each group.

11. A fruit-grading table provided with longitudinal feed-conveyers arranged at the sides of said table, a return-conveyer situated between and movable in opposite direction to the feed-conveyers, assorting-pockets adjacent to the feed-conveyers, a divided receptacle disposed above the feed-conveyers and having their bottoms arranged to deliver the load to said feed-conveyers, and means for supplying a load to said elevated receptacle.

12. A fruit-assorting table provided with feed-channels and an intermediate return-channel, feed-conveyers arranged in the feed-channel, a return-conveyer movable in the return-channel and in an opposite direction to the feed-conveyers, a series of delivery-conveyers arranged below the feed and return conveyers and movable in the same direction as the feed-conveyers, and assorting-pockets disposed at the sides of the table adjacent to the feed-conveyers and having spouts arranged to extend beneath the return-conveyer and to discharge the load upon the series of delivery-conveyers.

In testimony whereof I have signed my name to this specification in the presence of two subscribing witnesses.

CLINTON D. NELSON.

Witnesses:
W. A. JOHNSTONE,
E. M. WHEELER.